United States Patent
Davis

(10) Patent No.: US 7,837,036 B2
(45) Date of Patent: Nov. 23, 2010

(54) REUSABLE NESTING AND DENESTING PLASTIC CONTAINER

(75) Inventor: Warren Brent Davis, Springfield, MO (US)

(73) Assignee: Warren Brent Davis Revocable Trust, Springfield, MO (US)

( * ) Notice: Subject to any disclaimer, the term of this patent is extended or adjusted under 35 U.S.C. 154(b) by 581 days.

(21) Appl. No.: 11/453,499

(22) Filed: Jun. 15, 2006

(65) Prior Publication Data

US 2007/0017920 A1    Jan. 25, 2007

Related U.S. Application Data

(60) Provisional application No. 60/702,346, filed on Jul. 25, 2005.

(51) Int. Cl.
  *B65D 21/00* (2006.01)
(52) U.S. Cl. ............... 206/505; 206/519; 220/608; 220/669
(58) Field of Classification Search ............... 220/604, 220/608, 781, 380, 319, 669; 206/505, 515, 206/519; D7/601, 602
  See application file for complete search history.

(56) References Cited

U.S. PATENT DOCUMENTS

| 3,288,340 | A | * | 11/1966 | Shapiro et al. ............ 206/519 |
| 3,311,257 | A | * | 3/1967 | Puente ..................... 206/512 |
| D322,032 | S | * | 12/1991 | Palisin, Jr. ................. D9/429 |
| 5,201,437 | A | * | 4/1993 | Burgdorf ................... 220/601 |
| 5,607,075 | A | * | 3/1997 | Burgdorf et al. ............ 220/319 |
| 5,685,452 | A | * | 11/1997 | Kristoffersson ............ 220/608 |
| 7,216,769 | B2 | | 5/2007 | Palder |
| 2005/0040068 | A1 | * | 2/2005 | Palder ....................... 206/499 |
| 2007/0205128 | A1 | | 9/2007 | Davis |

* cited by examiner

*Primary Examiner*—Anthony Stashick
*Assistant Examiner*—Jeffrey Allen
(74) *Attorney, Agent, or Firm*—Husch Blackwell Welsh Katz

(57) ABSTRACT

The present invention pertains to a blow molded plastic container configured to hold food or food-related products, including cheese. In a first embodiment, the container includes extended vertical ribs that have a height that spans at least about ninety-five percent of a height of a lower portion of the container. In a second embodiment, the container includes a reinforced annular leg that is greater than the thickness of the container wall. In a third embodiment, the stacking bead is positioned between the lower and upper container walls, and the lower container wall is inwardly offset from the upper container wall. In a fourth embodiment, the container bottom is reinforced with continuous ribbing as opposed to only partial ribbing incorporated in containers known in the art.

6 Claims, 6 Drawing Sheets

REUSABLE NESTING AND DENESTING PLASTIC CONTAINER

CROSS-REFERENCE TO RELATED APPLICATIONS

This application claims the benefit of U.S. Provisional Application No. 60/702,346 filed on Jul. 25, 2005, which is incorporated by reference in its entirety.

BACKGROUND OF THE INVENTION

The present invention relates to blow molded plastic containers in which food or food-related products, including cheese, may be stored.

The food industry initially utilized containers made from steel for holding and/or transporting food, especially for holding and/or transporting cheese. Increased weight, cost, the undesirable appearance of rust and other considerations have led many food manufacturers and transporters of food to switch from steel to plastic containers. Small plastic containers are typically injection molded, allowing for greater flexibility in the design and manufacture of the shapes and contours of the containers. Larger, industrial sized containers, on the other hand, are typically blow molded, which encumbers design flexibility. For example, sharp corners and other design features may be designed and manufactured via injection molding with relatively few complications by, for example, the use of mold slides and other injection molding tools. The same design features, however, present greater challenges when manufacturing a larger, industrial sized container by blow molding. Thus, many features that would appear straightforward to use in smaller containers are often times deemed not feasible or altogether avoided in the manufacture of larger containers.

The containers must, nonetheless, meet several design criteria while still being hampered by blow molding manufacturing limitations. For example, the containers must be sufficiently durable to withstand forces during transport, such as the pressure from the food or food-related products pushing against the container walls and/or external forces from the containers bouncing or being pushed against a side of a transport vehicle. The containers must also properly store the food and still be sufficiently light for ease of handling.

To be easily stored, lids are removed from the containers, and the containers are nested within one another. But, the internal pressure from the food pushing outward against the container often causes the lower container portions and container bottoms to protrude outward and to permanently deform. The deformation makes it difficult and, in some cases, impossible to nest the containers within one another. Further, the containers must not buckle when subject to compressive forces.

In an attempt to prevent the lower container portions from deforming outwardly, some manufacturers implemented partial external ribbing that covered only about one-quarter of the lower container portion. The partial ribbing showed marginal, if any, benefits to prevent deformation—but the buckling problem and container floor deformation problems persisted.

In addition, because the containers are typically very heavy, especially when containing the food product, individuals typically tilt and roll the containers on a bottom annular leg of the container. The annular leg used on many containers, however, is relatively feeble, having about the same thickness as the container wall. Because of the large forces borne by the legs, the legs often permanently deform and, in extreme cases, fracture.

Some steel containers incorporate stacking beads to prevent a top container from sliding all the way within a bottom container in which the top container is nested. The stacking beads, however, are subject to large shear forces from the bottom containers pushing up on the stacking beads of the top containers. Specifically, the shear forces may cause the bead to bend upward or, in extreme cases, fracture. Further, when containers in the art are nested within one another, they often become wedged, making it difficult to denest (separate the containers from one another) the containers. Containers known in the art are also subject to other manufacturing and use problems.

Accordingly, there exists a need for an improved plastic, blow molded container that addresses the shortcomings of the containers now used in the art.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
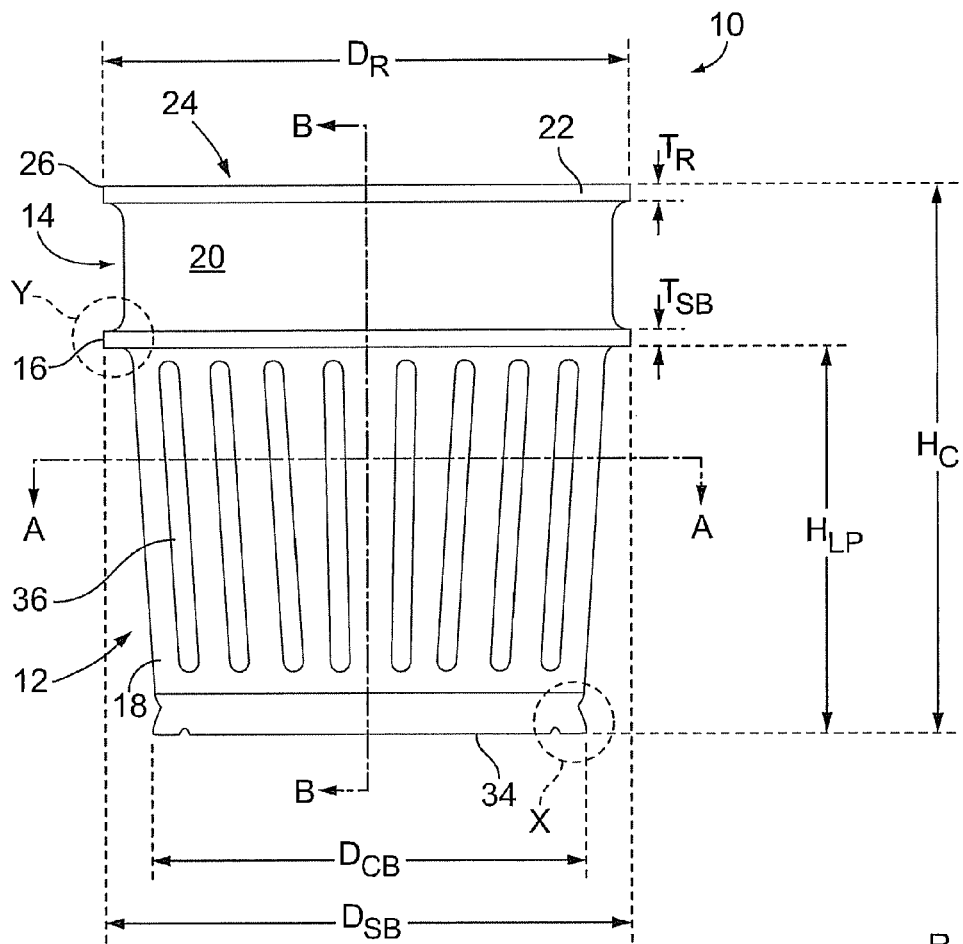
FIG. 1 is a front view of a first container incorporating embodiments of the invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

The present invention pertains to a blow molded plastic container configured to hold food or food-related products, including cheese. Pursuant to an embodiment of the invention, the container includes extended vertical ribs that have a height that spans at least about ninety-five percent of a height of a lower portion of the container. It is believed that the extended ribs prevent buckling of the container.

Pursuant to another embodiment of the invention, the container includes a reinforced annular leg that is at least greater than the thickness of the container wall. It is believed that the reinforced leg better absorbs forces when the container is tilted and rolled along the leg.

Pursuant to further embodiment of the invention, the stacking bead is positioned between the lower and upper container walls, and the lower container wall is inwardly offset from the upper container wall. It is believed that such a configuration reduces the shear stress that the stacking bead is subjected to and, thus, reduces potential deformation and failure of the stacking bead.

Pursuant to yet another embodiment of the invention, the container bottom is reinforced with continuous ribbing as opposed to only partial ribbing incorporated in containers known in the art. It is believed that the continuous ribbing increases strength and reduces container bottom deformation.

Pursuant to still another embodiment of the invention, the plane of the bottom wall is positioned such that when the toe of the container is placed flat on a floor, the container bottom is spaced from the floor when the container is empty, and does not protrude beyond the bottom of the toe when the container is full.

Pursuant to a sixth embodiment of the invention, an area just beneath the stacking ring can have an additional chamfer to permit adaptation to particular configurations of fork lifting equipment or to permit air flow so as to negate the potential for vapor lock holding stacked containers together.

Pursuant to a seventh embodiment of the invention, ribs can extend all the way up to the stacking ring to permit air to flow during nesting and denesting the containers to facilitate air to flow and prevent the formation of too much pressure in the stacked containers that can inhibit stacking, or prevent the formation of too little pressure in the nested containers that may inhibit denesting.

In one embodiment of the invention shown in FIG. 1, the container 10 includes lower and upper container portions 12, 14 that are separated by a stacking bead 16. The lower and upper portions 12, 14 are formed from lower and upper container walls 18, 20, respectively. The upper portion 14 includes a rim 22 that defines a container opening 24 and that has a diameter $D_R$, which is about twenty-four inches in a preferred embodiment. The rim 22 preferably extends outward from the container upper portion 14 to facilitate nesting. Specifically, the outward extension 26 of the rim 22 pushes up against a bottom surface 28 of the stacking bead 16 of a top container 30 (FIGS. 5 & 6) under which a lower container 32 is positioned. In a preferred embodiment, the stacking bead 16 has a diameter $D_{SB}$ of about twenty-four inches, and the upper portion 14 depends straight downward so that the diameter just below the rim 22 is substantially the same as the diameter just above the stacking bead 16.

To further facilitate nesting, the lower portion 12 of the container 10 tapers inward so that a diameter of the container bottom $D_{CB}$ has a diameter smaller than the diameter of the upper portion and, in a preferred embodiment, a diameter of about twenty inches.

The container 10 shown in FIG. 1 is comprised of a plastic material and, in a preferred embodiment: the container is comprised of high density polyethylene; the height of the container $H_C$ is about thirty-six inches; the height of the lower portion $H_{LP}$ is about twenty-five inches; the thickness of the rim $T_R$ is between about one-quarter and three-eighths of an inch; and, the thickness of the stacking bead $T_{SB}$ is between about one-eighth and one-quarter of an inch.

Figure 2:
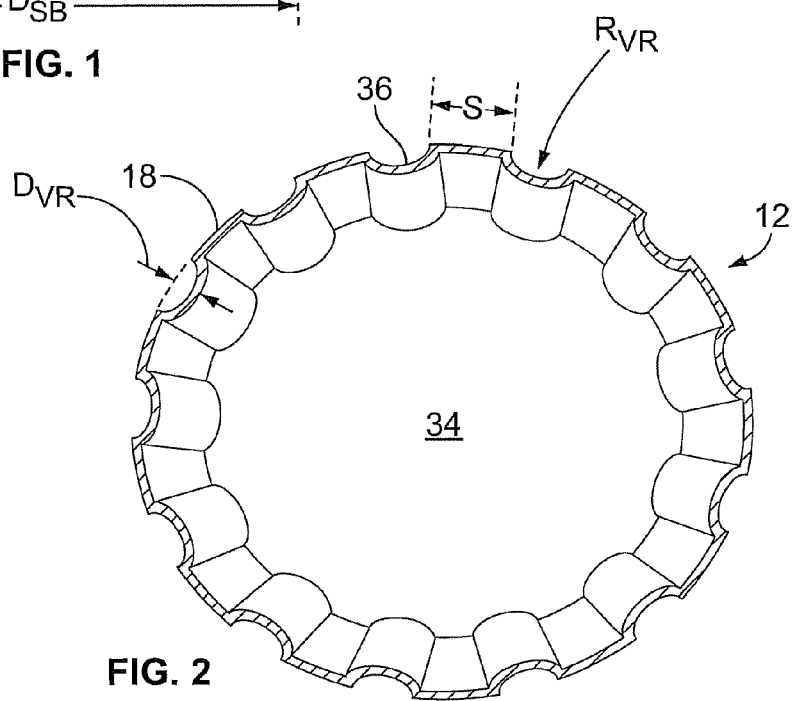
FIG. 2 is a cross-sectional view along the line A-A shown in FIGS. 1 & 9.
Figure 3:
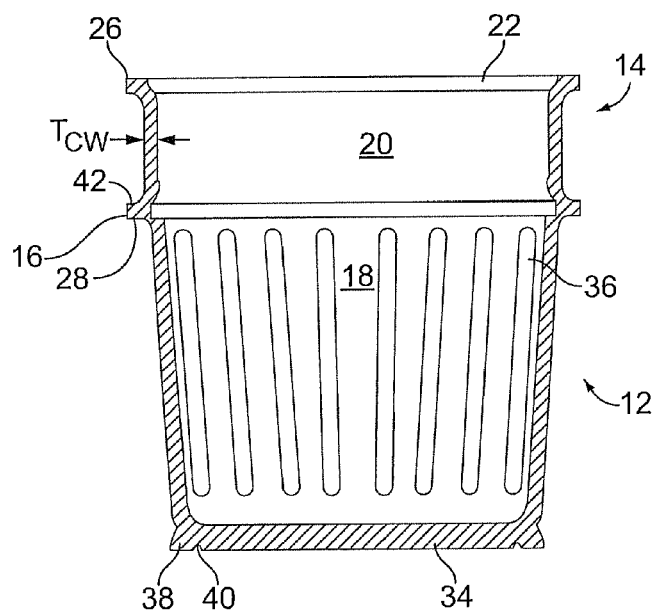
FIG. 3 is a cross-sectional view along the line B-B shown in FIG. 1.

Pursuant to the first embodiment of the invention shown in FIGS. 1, 2 and 3, extended vertical ribs 36 have a height that is at least about ninety-five percent of the height of the lower container portion $H_{LP}$. The ribs 36 extend from a first end adjacent the container bottom to a second end adjacent the stacking bead 18 are defined by substantially smooth curves and can be defined by, for example, oval type shapes. In an alternative embodiment of the invention shown in FIG. 9, the container has one or more air passage vertical ribs 37 that extend from a first end all the way up to a second expanded end at the bottom surface 28 of the stacking bead 16. In a further alternative embodiment, the extended ribs 36 are defined by substantially semi-circular cross sections.

It is believed that, when known containers are subject to forces, portions of the lower container "panel" and transform from being substantially circular to becoming substantially oval and form flat areas. It is believed that the flat areas lead to unwanted buckling when the containers are subject to compressive forces. The extended vertical ribbing 36 of the first embodiment is believed to prevent paneling and, thus, buckling. Further, it is believed that the ribs 36 allow for increased air flow paths when containers 10 are denested (separated from one another when nested within one another), thus easing the denesting process.

The depth of the ribs $D_{VR}$, e.g., the amount the ribs extend into the interior of the container 10, should not be too large in order to avoid problems cleaning the container 10 after food product is removed from the container. Further, there should be a sufficient number of ribs 36 to prevent paneling, and the ribs should be spaced from one another. In the first embodiment, the extended vertical ribs 36 are defined by a radius RVR that is about equal to how far the ribs are spaced S from one another, and the depth of the ribs $D_{VR}$ is about one-quarter of the spacing S distance. In the preferred embodiment, the ribs are defined by a radius of about 0.63 inches.

Figure 4:
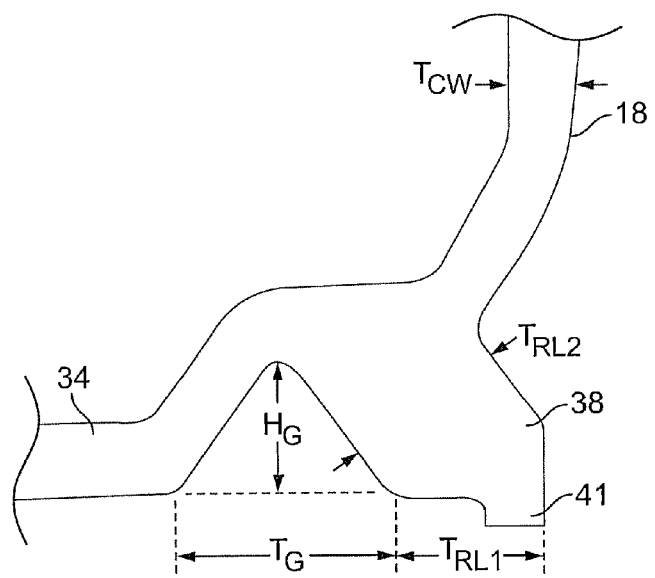
FIG. 4 is a blown up and cross-sectional view of the area shown by the letter X in FIG. 1.

Pursuant to the embodiment of the invention shown in FIGS. 1 and 4, a reinforced annular leg 38 is formed along the container bottom 34. The reinforced leg 38 includes a thickness that is greater than the thickness of the container wall $T_{CW}$, which is about 0.19 to about 0.25 inches thick in a preferred embodiment. In the first embodiment, the reinforced leg is defined by first and second thicknesses $T_{RL1}$, $T_{RL2}$, both of which are greater than the thickness of the container wall. In one preferred embodiment, the first thickness $T_{RL1}$ is about two times as thick as the container wall 18, 20 and is about 0.38 to about 0.5 inches thick; and, the second thickness $T_{RL2}$ is about two and one-quarter times as thick as the container wall 18, 20 and is about 0.43 inches to about 0.56 inches thick.

Further, in the embodiment of FIGS. 1 and 4, there is a gap 40 between the reinforced leg 38 and other portions of the container bottom 34. The gap is defined by a width $T_G$ that is not more than about five times as wide as the container wall thickness $T_{CW}$ and, in a preferred embodiment, is about 0.75 inches wide. The height of the gap $H_G$ is not more than about five times as thick as the container wall thickness $T_{CW}$ and, in a preferred embodiment, is about 0.75 inches high.

The increased thickness and material of the reinforced leg 38 allow the reinforced leg to better withstand forces that it is subjected to when the container 10 is tipped on its side or rolled, when the entire weight of the container is borne by the leg.

Those of skill in the art will appreciate that, although a particular shape and design of a reinforced annular leg 38 is shown, many other reinforced annular legs are covered by the scope of this invention that have a thickness greater than the thickness of the container wall. For example, in other embodiments not shown, the toe 41 of the preferred embodiment that protrudes from the annular leg 38 is absent.

As described above, containers of the invention also incorporate stacking beads 16 that facilitate denesting and prevent the containers from being wedged within one another when they are nested. Specifically, the stacking bead prevents a top container from sliding all the way into and wedging or being stuck within the lower container in which it is nested.

Pursuant to the embodiments of the invention shown in FIGS. 1, 5, 6, and 9, 10, and 12, the stacking bead 16 is positioned between the lower and upper container walls 18, 20, and the lower container wall 18 is inwardly offset from the upper container wall 20. A top surface 42 of the stacking bead 16 extends from the upper container wall 20. The bottom surface 28 of the stacking bead 16 extends from the lower container wall 18 and is longer than the top surface 42 of the stacking bead 16. As a result, when a top container 30 is stacked on top of a lower container 32, the walls of the lower container 18, 20 push up against not only the stacking bead 16 (of the top container 30) but also against the upper container wall 20 of the top container 30. It is believed that such a configuration reduces the shear stress that the stacking bead is subjected to and, thus, reduces potential deformation and failure of the stacking bead.

Figure 5:
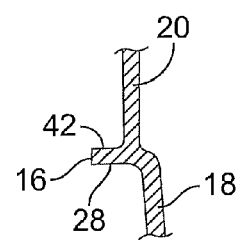
FIG. 5 is a blown up and cross-sectional view of the area shown by the letter Y in FIG. 1.
Figure 6:
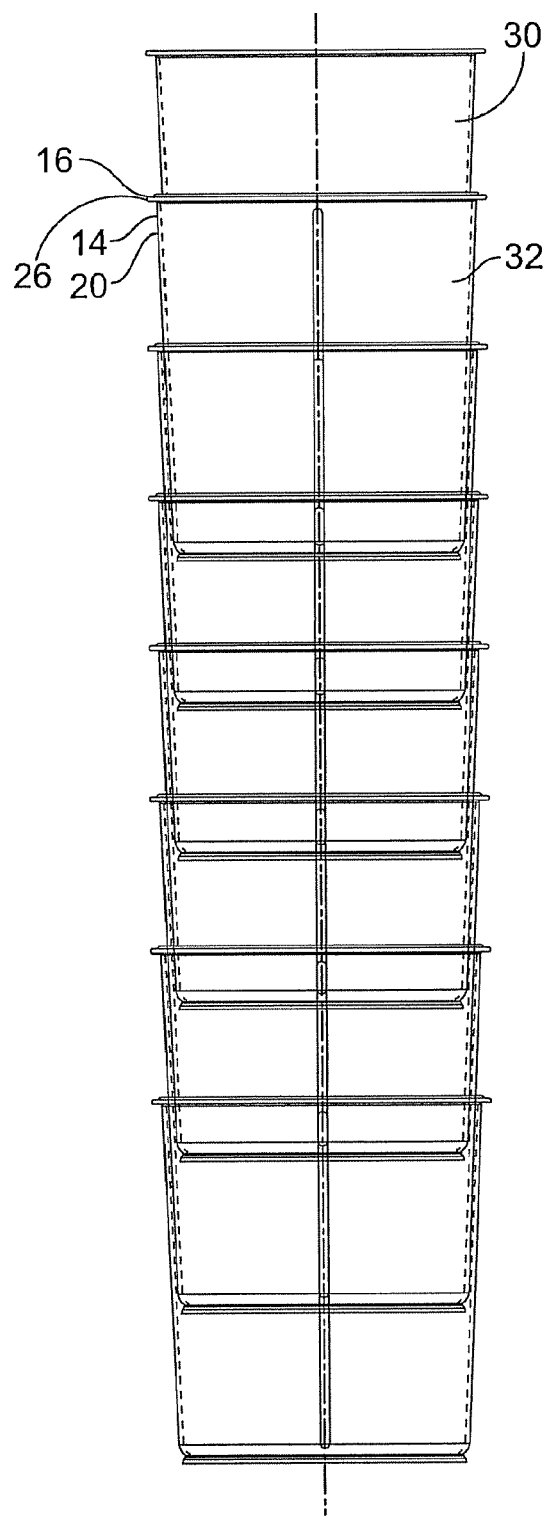
FIG. 6 shows a plurality of containers stacked atop of one another pursuant to embodiments of the invention.
Figure 8:
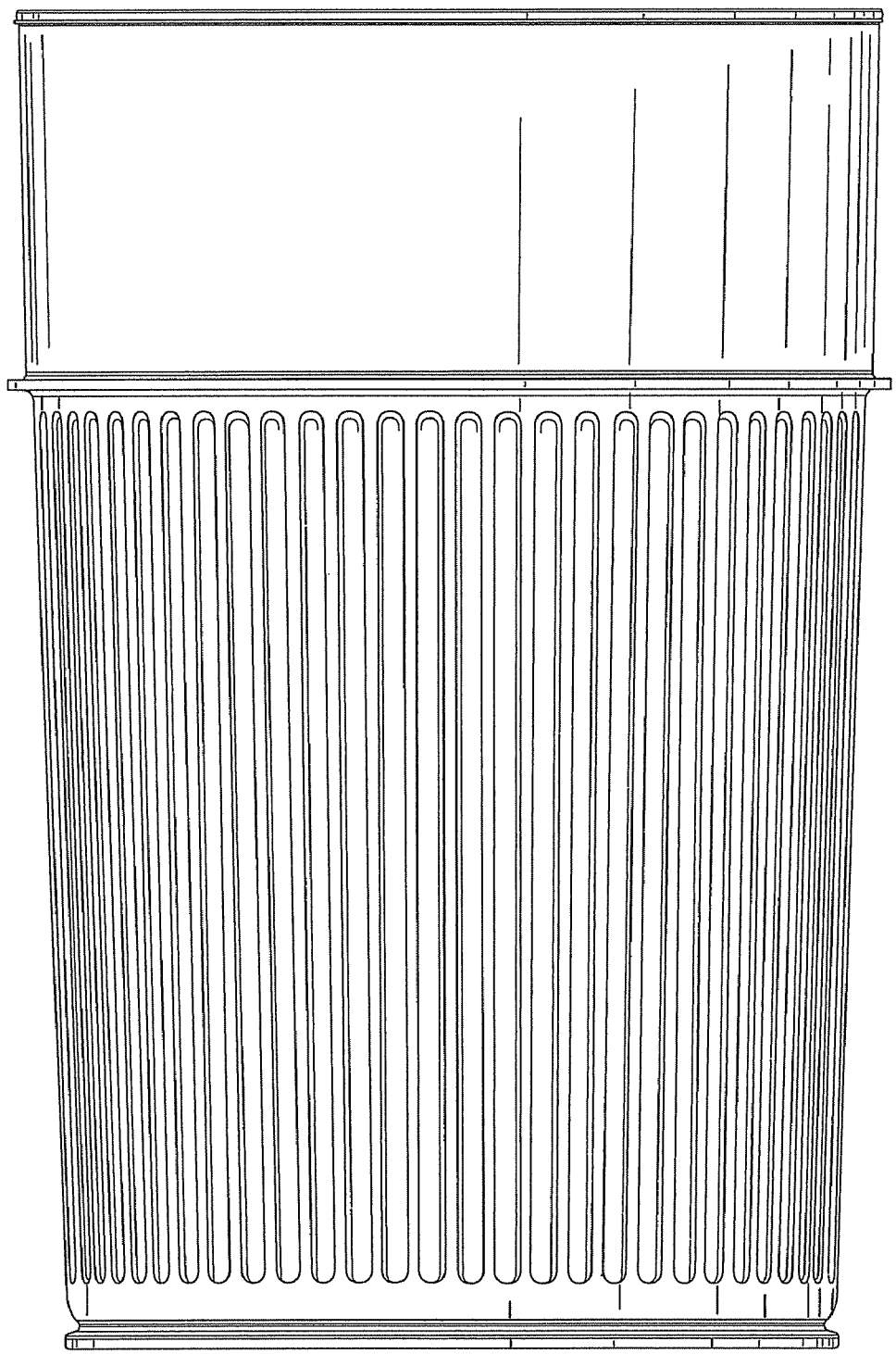
FIG. 8 is a more detailed front view of the first container incorporating embodiments of the invention.
Figure 12:
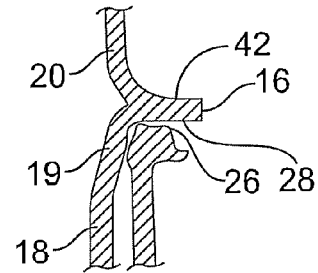

Referring to FIGS. 5 and 12, showing the intersection of two nested containers, more detail in the structure can be seen. In particular, in a preferred embodiment shown in FIG. 12, a transitional chamfer 19 can be used to precisely adapt the diameter of the container to desired handling equipment, and can also serve the function of facilitating the function of the air passage vertical ribs 37.

Figure 7:
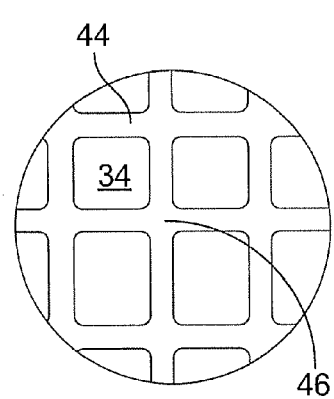
FIG. 7 shows a bottom view of a container bottom pursuant to a fourth embodiment of the invention.

Pursuant to the embodiment of the invention shown in FIG. 7, the container bottom 34 is reinforced with continuous waffle ribbing 44 as opposed to only partial waffle ribbing incorporated in containers known in the art. Containers known in the art are manufactured from blow molding, which entails inserting a tube of plastic within two halves of the mold and inserting an air tube near or on a pinch area of the mold. Air is then blown through the tube and expands the plastic to the outer periphery of the mold. Those of skill in the art believe that the pinch area should be flat to facilitate inserting the air tube within the mold and that it would be unfeasible to use a non-flat pinch area. Ribbing, therefore, was never formed adjacent the pinch-area. Pursuant to the embodiment, however, it is believed that it is feasible to insert the air tube by a non-flat pinch area 46 that is adjacent to or on the ribbing 44. It is believed that the continuous waffle ribbing 44 increases container bottom strength and reduces container bottom deformation.

Pursuant to a second illustrative container of the invention shown in FIGS. 9 through 12, particularly suitable for formation through blow molding, a reinforced annular leg 38 is still formed along the container bottom 34. However, in this embodiment, the reinforced leg 38 includes a thickness that is greater than the thickness of the container wall $T_{CW}$, which is about 0.19 to about 0.25 inches thick in a preferred embodiment. In the preferred embodiment, the reinforced leg is defined by first and second thicknesses $T_{RL1}$, $T_{RL2}$, both of which are greater than the thickness of the container wall. In one preferred embodiment, the first thickness $T_{RL1}$ is about two times as thick as the container wall 18, 20 and is about 0.38 to about 0.5 inches thick; and, the second thickness $T_{RL2}$ is about one and a half times as thick as the container wall 18, 20 and is about 0.29 inches to about 0.38 inches thick.

Figure 9:
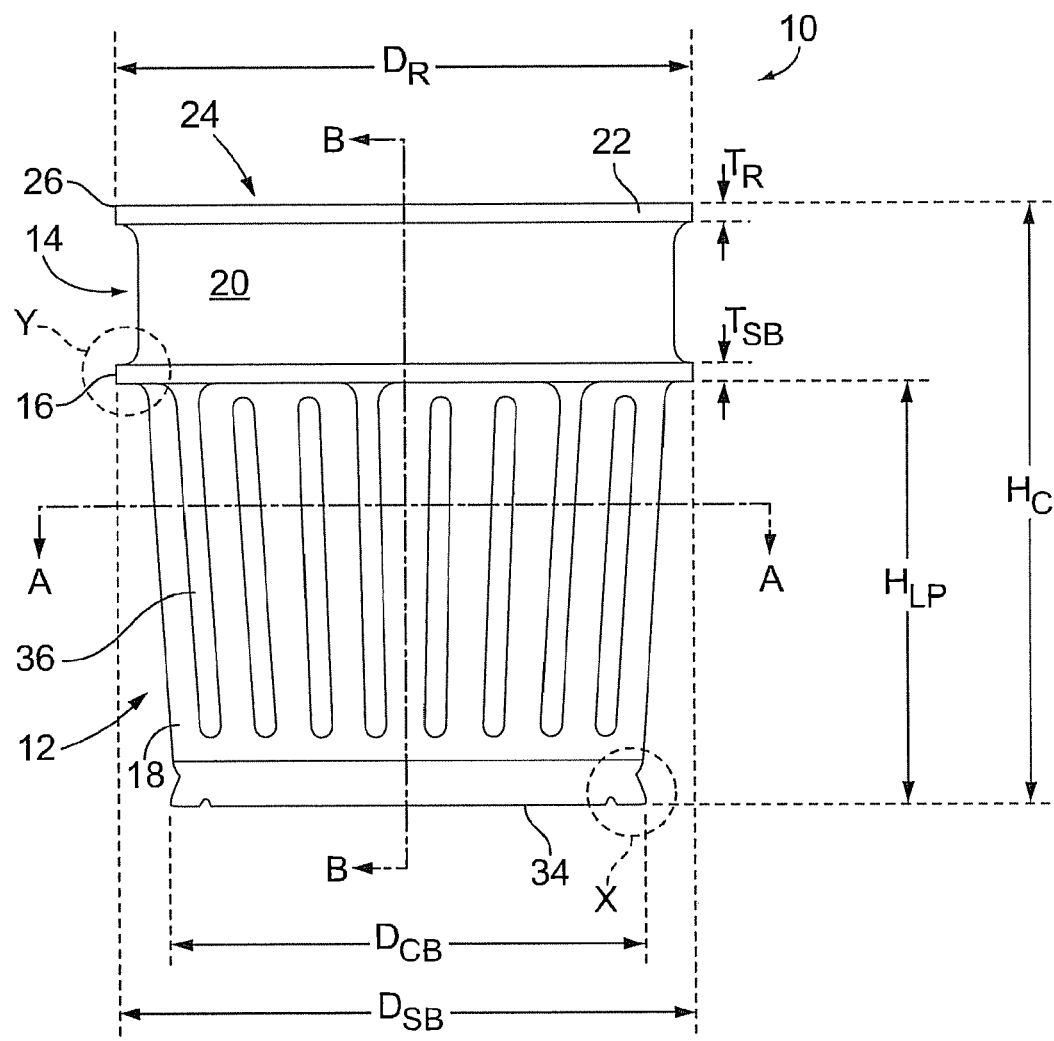
FIG. 9 is a front view of a second container incorporating embodiments of the invention.
Figure 10:
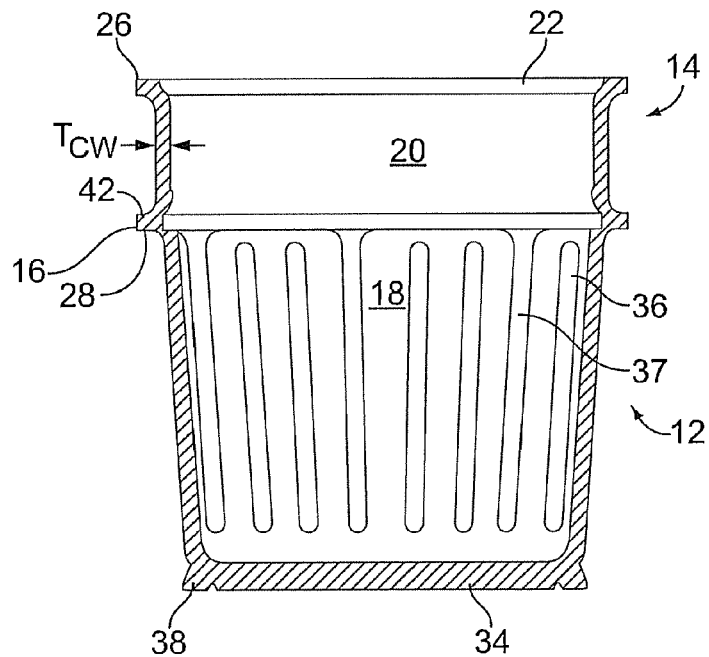
FIG. 10 is a cross-sectional view along the line B-B shown in FIG. 9.
Figure 11:
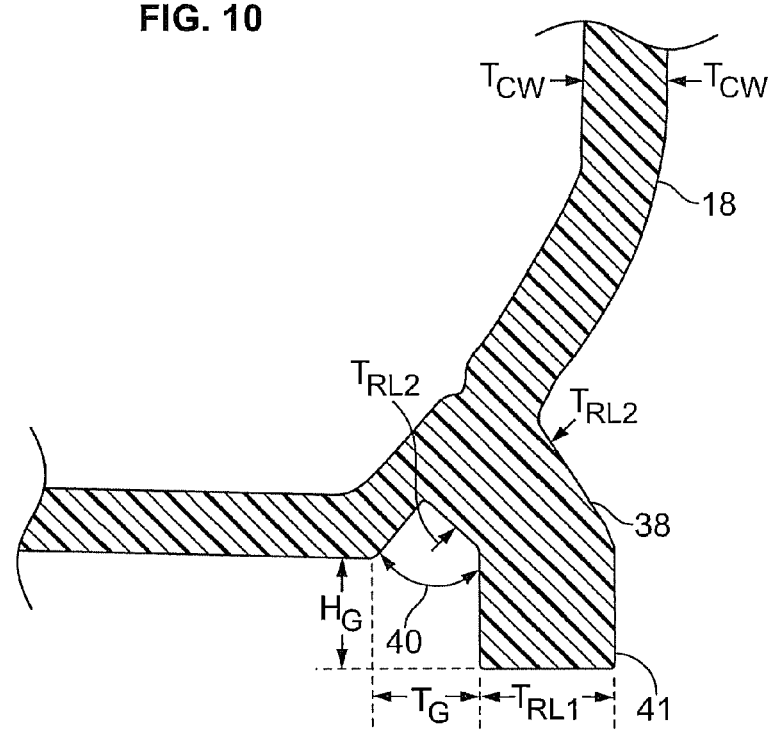
FIG. 11 is a blown up and cross-sectional view of the area shown by the letter X in FIG. 9; and, FIG. 12 is a blown up and cross-sectional view of the area shown by the letter Y in FIG. 9.

Further, in the embodiment of FIGS. 9 and 11, there is a gap 40 between the reinforced leg 38 and other portions of the container bottom 34. The gap is defined by a width $T_G$ that is not more than about five times as wide as the container wall thickness $T_{CW}$ and, in a preferred embodiment, is about 0.75 inches wide. The height of the gap $H_G$ is not more than about two times as thick as the container wall thickness $T_{CW}$ and, in a preferred embodiment, is about 0.38 inches high.

The increased thickness and material of the reinforced leg 38 allow the reinforced leg to better withstand forces that it is subjected to when the container 10 is tipped on its side or rolled, when the entire weight of the container is borne by the leg.

Those of skill in the art will appreciate that, although a particular shape and design of a reinforced annular leg 38 is shown, many other reinforced annular legs are covered by the scope of this invention that have a thickness greater than the thickness of the container wall. For example, in other embodiments not shown, the toe 41 of the preferred embodiment that protrudes from the annular leg 38 is absent.

From the foregoing it will be observed that numerous modifications and variations can be made to the invention without departing from the true spirit and scope of the novel concepts of the present invention. It is to be understood that no limitation with respect to the specific embodiments illustrated is intended or to be inferred. The disclosure is intended to cover all such modifications as fall within the scope of the invention.

The invention claimed is:

1. A plastic container for storing food, the container comprising,
   an upper container portion having upper container walls, the upper container further including a rim that defines a container opening,
   a lower container portion having lower container walls,
   an annular horizontal stacking bead separating the upper portion from the lower portion said stacking bead having a rectangular shape, and a bottom surface longer than a top surface, wherein the upper container portion, stacking bead and lower container portion are integral with one another, the lower container portion having a container bottom,
   the lower container portion tapering from the stacking bead to the container bottom and having a plurality of vertical inwardly extending ribs formed thereon and being defined by a container height, wherein each one of the plurality of vertical ribs span at least about ninety-five percent of the container height, each one of the plurality of vertical ribs having a lower end spaced from the container bottom,
   said plurality of ribs including a first plurality of ribs and a second plurality of ribs, said first plurality of ribs terminating at an upper end spaced from said stacking bead, and having a substantially uniform cross-section along their individual lengths
   said second plurality of ribs having an upper end contacting the stacking bead and the second plurality of ribs each laterally widening between the stacking bead and the upper end of said first plurality of ribs to form an air passageway for passage of air upon removal of one stacked container from another.

2. The plastic container of claim 1, wherein each one of the first plurality of ribs are defined by a semi-circular cross-sectional shape.

3. The plastic container of claim 2, wherein each one of the plurality of ribs are defined by a radius and are spaced from one another.

4. The plastic container of claim 1, wherein the annular stacking bead further comprises a thickness, a bottom surface and a top surface, the top portion of the lower container wall being inwardly offset from a lower portion of the upper container wall so that, when the plastic container is stacked on top of a lower container, a lower container rim contacts both the bottom surface of the stacking bead and the upper container portion of the container.

5. The plastic container of claim 1, wherein the container bottom includes waffles formed thereon, the waffles spanning substantially the entire container bottom.

6. The plastic container of claim 1, wherein the lower container portion of the plastic container is suitable for nesting inside the lower container portion of a second plastic container when the plastic container is stacked on top of the lower container portion of the second plastic container, the upper container walls of the plastic container extending perpendicular to the rim of the lower container portion and in substantially a same vertical plane as upper container walls of the lower container portion, the upper container portion of the plastic container and upper container portions of additional containers successively nested within one another and stacked on top of the plastic container forming a substantially cylindrical column extending from the lower container portion.

* * * * *